United States Patent [19]

Alexander et al.

[11] Patent Number: 4,678,649

[45] Date of Patent: Jul. 7, 1987

[54] PROCESS FOR THE MANUFACTURE OF MONOPOTASSIUM PHOSPHATE

[75] Inventors: Iosef Alexander; Menachem Bar-on, both of Arad, Israel

[73] Assignee: Negev Phosphates Ltd., Israel

[21] Appl. No.: 872,061

[22] Filed: Jun. 6, 1986

[30] Foreign Application Priority Data

Jul. 10, 1985 [IL] Israel ........................................ 75767

[51] Int. Cl.$^4$ ........................ C01B 15/16; C01B 25/26
[52] U.S. Cl. .................................... 423/308; 423/312; 71/34
[58] Field of Search ............... 423/305, 307, 308, 309, 423/311, 312; 71/34

[56] References Cited

U.S. PATENT DOCUMENTS

| | | | |
|---|---|---|---|
| Re. 29,458 | 10/1977 | Drechsel et al. | 423/309 X |
| 2,902,341 | 9/1959 | Baniel et al. | 423/309 |
| 3,718,453 | 2/1973 | Thompson | 71/34 |
| 3,803,884 | 4/1974 | Thompson | 71/34 |
| 3,956,464 | 5/1976 | Drechsel et al. | 423/308 |
| 4,160,657 | 7/1979 | Drecshel | 423/767 X |

FOREIGN PATENT DOCUMENTS 1203444  8/1970  United Kingdom ................ 423/308

*Primary Examiner*—Gregory A. Heller
*Attorney, Agent, or Firm*—Morgan & Finnegan

[57] ABSTRACT

The present invention relates to a process for the manufacture of monopotassium phosphate of a high purity without utilizing organic solvents. According to the process, monopotassium sulfate is reacted, at a temperature in the range of between 40 to 100 degrees with a phosphate constituent selected from phosphate rock, dicalcium phosphate or mixtures thereof in the presence of phosphoric acid. The common metal impurities, organic matter and fluorides present in the starting phosphate rock are substantially elininated, with the calcium sulfate resulted thereto. After separating out the calcium sulfate, the filtrate is neutralized to a pH in the range of between 3 to 7, with a calcium-containing compound comprising $Ca(OH)_2$, CaO or $CaCO_3$, or mixtures thereof. From the filtrate obtained, pure monopotassium phosphate is crystallized out. The process is characterized by a high recovery of the $P_2O_5$ and $K_2O$ values, the monopotassium phosphate produced being completely free of chloride ion.

9 Claims, No Drawings

PROCESS FOR THE MANUFACTURE OF MONOPOTASSIUM PHOSPHATE

The present invention relates to a new process for the manufacture of monopotassium phosphate. More particularly the present invention relates to a new process for the direct manufacture of pure monopotassium phosphate which does not involve the use of organic solvents.

Monopotassium phosphate is considered a most valuable fertilizer because of its high content of both potassium and phosphate in an available form. The total plant food of this fertilizer is 86.8%, which is higher than most of the other known fertilizers. Besides its very high plant food content, monopotassium phosphate possesses a very low salt index (8.4) compared with 46 for potassium sulfate, 116.3 for potassium chloride and 29.9 for monoammonium phosphate. Another important property of this fertilizer is its very high water solubility (26.6 g/100 g water at 25 degrees C.). The significance of high water-solubility for the agricultural value of phosphate fertilizers was proven by field experiments and found especially important for crops with short growing seasons.

Monopotassium phosphate was first prepared already in 1821, by the neutralization of phosphoric acid with a solution of potassium carbonate and crystallizing out the product. Of course this method has only a theoretical interest and can not be considered applicable on a commercial scale for fertilizer purposes. There are known a series of Patents for the manufacture of monopotassium phosphate by heating potassium chloride with phosphoric acid, in various molecular proportions, whereby a double salt of monopotassium phosphate+- phosphoric acid resulted. The phosphoric acid is removed by an organic solvent and thus the desired monopotassium phosphate is obtained. Some modification of this method consisted in adding equimolecular proportions of potassium chloride and phosphoric acid into a saturated solution of phosphoric acid and monopotassium phosphate whereby a complete transformation of potassium chloride into potassium phosphate was obtained at 200 degrees C., if an excess of phosphoric acid was used over the ratio of 1:1. The costs of production according to these methods is comparatively high and up to now there is no any commercial plant utilizing this approach.

The temperature parameter for the reaction between the potassium chloride and phosphoric acid was fully investigated. It was found that at atmospheric pressure, temperatures above 160 degrees C. are required for a complete conversion of $K^+$ to potassium monophosphate. However at temperatures above 200 degrees C., water insoluble potassium metaphosphate is produced and in most of the patents it is suggested not to surpass this temperature.

In a recent U.S. Pat. No. 4,160,657 a process is described for the preparation of monocalcium phosphate and phosphoric acid. According to the process, phosphate rock is reacted with an excess of phosphoric acid, having a concentration in the range of between 25% to 55% by weight $P_2O_5$. By cooling the reaction mixture, solid monocalcium phosphate is separated and reacted with a member selected from the group consisting of dipotassium sulfate, monopotassium sulfate or mixtures thereof producing monopotassium phosphate, monopotassium phosphate-phosphoric acid and gypsum.

In order to complete the state of the art in this field, it should perhaps be interesting to mention the process for the manufacture of monopotassium phosphate from potassium chloride and phosphoric acid d (as described in Israeli Pat. No. 9539) carried out at ambient temperature. According to this process, a great excess of phosphoric acid is utilized, and the mixture of phosphoric acid and hydrochloric acid is removed by solvent extraction using water immiscible organic solvents. The monopotassium phosphate is crystallized from the aqueous solution resulted after removal of the acids. The process is indeed quite elegant, but its implementation on a commercial scale is quite questionable particularly in view of the high costs involved concerning the organic solvents and energy required to separate the phosphoric acid from the hydrochloric acid.

It is an object of the present invention to provide a simple process for the manufacture of monopotassium phosphate. It is another object of the present invention to provide a simple process for the manufacture of monopotassium phosphate which does not require the use of organic solvents for separation of phosphoric acid. It is yet another object of the present invention to provide a simple process for the manufacture of monopotassium phosphate which does not require temperatures above 100 degrees C., and thus avoids completely the danger of metaphosphate production. Thus the invention consists of a process for the manufacture of monopotassium phosphate which comprises the steps of: (a) reacting monopotassium sulfate with a phosphate constituent selected from the group consisting of phosphate rock, dicalcium phosphate or mixtures thereof in the presence of phosphoric acid, and separating the formed calcium sulfate; (b) neutralizing the filtrate obtained in step (a) with a calcium-containing compound comprising $Ca(OH)_2$, $CaO$ or $CaCO_3$ or mixtures thereof, and (c) crystallizing from the filtrate obtained in step (b) substantially pure monopotassium phosphate. The preferred amount of phosphoric acid in step (a) should be in the range of 5% to 40% of the total $P_2O_5$ present at the end of the step, and most preferably in the range of 10% to 35% of the total $P_2O_5$. Above 35%, the process is still operable, but any excess above this value is actually a waste of $P_2O_5$. The concentrate of the $P_2O_5$ is not critical and can be selected in a very broad range. Using the above steps, the product obtained will not be accompanied by phosphoric acid (double salt monopotassium phosphate-phosphoric acid) as encountered in the prior art methods.

One of the characteristics of the system in the present invention is the absence of monocalcium phosphate. This is a result of an excess of the sulfate ion which is present therein, which excludes the formation of monocalcium phosphate, due to the formation of the insoluble calcium sulfate. The excess of sulfate ion has also a beneficial effect on the generation of well-shaped crystals of gypsum with the consequence of their easy filtration, washing and separation.

The starting reagent for the present invention is monopotassium sulfate. As known, this salt is easily obtained in the reaction between potassium chloride and sulfuric acid. As appears from the reactions presented below, the reaction between potassium chloride and sulfuric acid occurs in two distinct steps:

$$KCl + H_2SO_4 \rightarrow KHSO_4 + HCl (H = -3.91 Kcal/mole). \qquad (1)$$

$$KCl + KHSO_4 \rightarrow K_2SO_4 + HCl \quad (H = +17.1 \text{ Kcal/mole}). \quad (2)$$

The first reaction for the formation of monopotassium sulfate occurs smoothly and is much more easily performed (being exothermic) than the second one of dipotassium sulfate formation (which is endothermic). The proper conditions for the preparation of monopotassium sulfate are well known from the prior art, its preparation being not considered part of the present invention. As known, the temperatures at which it takes place are low enough to permit the use of corrosion-resistant plastics, thus reducing the capital costs.

The temperatures involved in the process according to the present invention are generally in the range of between 40 to 100 degrees centigrade and preferably in the range of 60 to 80 degrees centigrade. The above relatively low temperatures range, exclude completely the possibility of co-producing the insoluble potassium phosphate, known under the name of potassium metaphosphate, which are obtained in the prior art methods based on the reaction between KCl and phosphoric acid. As known, the prior art references are utilizing temperatures above 160 degrees centigrade and generally close to 200 degrees centigrade in order to complete the expulsion of HCl resulting in the reaction:

$$2H_3PO_4 + KCl \rightarrow KH_2PO_4 \cdot H_3PO_4 + \tfrac{1}{2}HCl. \quad (3)$$

Other advantages from utilizing the lower temperature range in the process according to the present invention are connected obviously with the save of energy, as well as to the less corrosive conditions for the equipment which prevail thereto.

According to a preferred embodiment, which enables to obtain a maximum yield of $P_2O_5$ and $K_2O$ recovery, it is suggested to carry out the reaction with phosphate rock or dicalcium phosphate (or mixtures thereof) in two or more stages: in the first stage, the reaction occurs between monopotassium sulfate and part of the phosphate rock or dicalcium phosphate (or mixtures thereof) in the presence of phosphoric acid. The phosphoric acid may be added such as, or produced in-situ from an additional amount of phosphate rock or dicalcium phosphate and sulfuric acid. The use of phosphoric produced in-situ has significant economical advantages in view of the improved filtration properties of the gypsum resulted thereof. In the second stage the reaction products resulted from the first stage are reacted with a new portion of phosphate rock or dicalcium phosphate. An additional advantage of this embodiment is the fact that the gypsum formed thereof, possesses improved filtration properties which enables its easy separation. Furthermore an appreciable amount of organic matter present in the phosphate rock will be also removed.

In order to obtain a maximum conversion of the $K^+$ value into the monopotassium phosphate, it is suggested to carry out a desulfatization of the solution resulting from step (a), prior to its neutralization. This can be accomplished by the reaction of said solution with calcium phosphate (as presented in the chemical reaction 5 given below). In this case the amount of phosphoric acid present in the system will be generally in the range of about 5 to 18% by wt $P_2O_5$. The result of this step will be that the solution entering to the neutralization will be substantially depleted from the sulfate ion, which is an additional advantage by increasing the conversion of the potassium ion into monopotassium phosphate.

The chemical reactions involved in the process according to the present invention are given in the equations presented as follows:

$$6KHSO_4 + Ca_3(PO_4)_2 + 5H_3PO_4 + 6H_2O \rightarrow 3K_2SO_4 + 7H_3PO_4 + 3CaSO_4 \cdot 2H_2O. \quad (4)$$

$$3K_2SO_4 + Ca_3(PO_4)_2 + 7H_3PO_4 + 6H_2O \rightarrow 6KH_2PO_4 + 3H_3PO_4 + 3CaSO_4 \cdot 2H_2O. \quad (5)$$

$$6KH_2PO_4 + 3H_3PO_4 + 3CaO \rightarrow 6KH_2PO_4 + 3CaHPO_4 + 2H_2O. \quad (6)$$

$$3CaHPO_4 + 3KHSO_4 + 6H_2O \rightarrow 3KH_2PO_4 + 3CaSO_4 \cdot 2H_2O. \quad (7)$$

$$K_2SO_4 + H_3PO_4 + CaHPO_4 \rightarrow 2KH_2PO_4 + CaSO_4. \quad (8)$$

$$H_2SO_4 + 2CaHPO_4 + K_2SO_4 \rightarrow 2KH_2PO_4 + 2CaSO_4. \quad (9)$$

The second step of the process involves the neutralization of the filtrate obtained in step (a), said filtrate consisting of phosphoric acid and monopotassium phosphate. This neutralization is carried out either with calcium oxide (calcium hydroxide), calcium carbonate or other substances containing these compounds or any mixture thereof, depending on the availability of such reagents. Of course that the purity of the monopotassium phosphate product will be influenced, only to a small extent, on the purity of the calcium compound utilized in this neutralization. The final pH of the neutralized solution, should be in the range of between 3 to 7 and preferably in the range of 3.5 to 5. At the pH above 4.6, the neutralization occurs also with the monopotassium phosphate producing dipotassium phosphate along dicalcium phosphate according to the following equation:

$$2KH_2PO_4 + CaO \rightarrow K_2HPO_4 + CaHPO_4 + H_2O \quad (10)$$

The final neutralized product as obtained in this case, will be an equimolar mixture of monopotassium phosphate and dipotassium phosphate along with the insoluble dicalcium phosphate which is filtered off. Part of the dicalcium phosphate resulted can be recycled to step (a) in the reaction with monopotassium sulfate, or with sulfuric acid in case that the phosphoric acid is produced in situ. The mixture of monopotassium phosphate and dipotassium phosphate is a most valuable fertilizer by itself, having a $K_2O$ to $P_2O_5$ ratio of 1:1, and being completely water soluble. Other metal insoluble compounds, general present in the phosphate rock (such as Al, Ti, Fe, Zn, Cd etc.) will be also removed with the dicalcium phosphate which is filtered out. Also due to a decrease of gypsum solubility, the solution with the monopotassium phosphate will contain less dissolved sulfate and calcium ions.

According to another embodiment of the present invention, part of the dicalcium phosphate resulted after the neutralization can be utilized in the step of desulfatization the solution obtained in step (a), the chemical reaction (8) being involved in this case.

If desired, most of the above dicalcium phosphate could be recycled and utilized in the scheme of the process, provided that a corresponding amount of monopotassium sulfate will be also incorporated (according to equations 7 or 9). This variation might be important when there is no outlet for the resulted co-produced dicalcium phosphate.

The last step of the process involves the crystallization of the monopotassium phosphate from the solution containing it. This is a well known operation which is based on generation of crystals of monopotassium phosphate by changing the solubility of the salt as a function of temperature.

When a cold crystallization is carried out, the monopotassium phosphate will be very pure, being substantially free from any cation or anion impurity.

The monopotassium phosphate obtained in the process according to the present invention is characterized by its high purity since most of the impurities precipitate out and are removed with the gypsum produced in step (a) or with the dicalcium phosphate separated in step (b). It was found that the presence of dicalcium phosphate assists the filtration of the metal impurities, which generally possess bad filtration properties in view of their gelatinous characteristics. A typical analysis of the monopotassium phosphate crystals which are obtained in the process is as follows:

$P_2O_5 = 50.5\%$; $K_2O = 35.3\%$; water solubility: complete.

Al = less than 15 ppm; Cd = less than 0.3 ppm; Fe = 20 ppm;

Zn = 4 ppm; F = 73 ppm and Pb = less than 1 ppm.

If desired, the monopotassium phosphate obtained, can be easily transformed into a P-K liquid fertilizer (0-20-20) by its reaction with a solution of potassium hydroxide according to the following equation (11):

$$KH_2PO_4 + KOH = KH_2PO_4 + K_2HPO_4 + H_2O \qquad (11)$$

The product obtained in this case, appears as a clear solution, free of solids and colourless at pH 7. This approach illustrates the versatility of this process according to which another most valuable product would result. A person skilled in the art will select the proper scheme for utilizing the present invention according to his specific requirements and availabilities at site.

Summing up, the process according to the present invention is characterized by the following main advantages:

(1) Substantially pure monopotassium phosphate is obtained directly, without being accompanied by phosphoric acid which generally is present in the known processes.

(2) High recovery of the potassium and phosphorus values to the desired monopotassium phosphate is achieved. The losses of $K_2O$ are less than 5% and more than 75% of the input $P_2O_5$ are transformed into monopotassium phosphate.

(3) Relatively low temperatures, which do not surpass 100 degrees centigrade are involved, fact which saves appreciable amounts of energy and reduces considerably the corrosion problems of the equipment.

(4) The calcium sulfate co-produced in the process, can be easily removed due to the improved filtration properties. Furthermore, some of the organic matter (present in the phosphate rock) is also removed together with the calcium sulfate.

(5) Together with gypsum or dicalcium phosphate which is separated from the gypsum, most of the metal impurities as well as fluorides are removed. Therefore no additional operation should be imposed to obtain a pure product.

(6) When there is no outlet for the dicalcium phosphate co-produced, most or even all of it could be recycled into the process.

(7) The process is characterized by the high recovery of the $K_2O$ and $P_2O_5$ values.

(8) The product obtained is of a very high purity, being almost substantially free of chloride.

While the invention will now be described in connection with certain preferred embodiments in the following Examples, it will be understood that it is not intended to limit the invention to these particular embodiments. The following Examples which include preferred embodiments will serve to illustrate the practice of this invention, it being understood that the particulars described are by way of example and for purposes of illustrative discussion of preferred embodiments of the present invention, without being limited thereto. In the Examples the concentrations are expressed in weight percent.

EXAMPLE 1

In a 2 l glass reactor, provided with a stirrer and controlled heating, the following reagents were introduced during 1 hour, the flask being maintained at 70 degrees centigrade:

408.3 g of monopotassium sulfate. 288 g of phosphoric acid (54% $P_2O_5$).

1029 g of tap water, and 182.6 g of phosphate rock (obtained from cyclone at Arad mine) containing 31.5% $P_2O_5$.

The mixture was agitated for an additional hour. To the resulting mixture an additional amount of 182.6 g of the same phosphate rock (cyclone source) and 25 g of the same phosphoric acid were added and the agitation continued for an additional hour.

The mixture amounting to 2740 g was filtered; the filter cake consisting mainly of calcium sulfate hydrate was washed by 3 portions of 600 mls water obtaining an amount of 865 g of washed filter cake (22.4% humidity). The analysis of the cake (on dry basis) was as follows:

$P_2O_5$: 2.4% (as total $P_2O_5$), the unreacted $P_2O_5$ being 2.17%.

$K_2O$: 1.4%.

CaO: 31.2%.

The analysis of the resulting filtrate (amounting to 1552 g) was as follows:

$P_2O_5$: 15%

$K_2O$: 7.12%

CaO: 0.45%, and $SO_4$: 2.41%.

An amount of 94.4 g of calcium carbonate (100%) was added during 60 minutes to 1000 g of the above filtrate at a temperature of about 40 degrees centigrade. A precipitate of dicalcium phosphate (in its dihydrated form) was noticed. The resulting slurry amounted to 1045 g was filtered obtaining 237.5 g of filter cake (dicalcium phosphate) and 742.3 g of filtrate (substantially pure monopotassium phosphate). The analyses of the precipitate and filtrate were as follows:

Precipitate: 37.2% $P_2O_5$; 0.33% F— and 1.95 molar ratio CaO: $P_2O_5$.

Filtrate: 10.4% $P_2O_5$; 7.73% $K_2O$; 1.43% $SO_4$ and 0.22% CaO.

From the filtrate an amount of 700 g $H_2O$ was evaporated from which 122 g of crystals of monopotassium phosphate (22.7% humidity) were obtained having the following composition:

50.4% $P_2O_5$; 34.3% $K_2O$; 3.6% $SO_4$; 0.8% CaO, and 0.015% F.

EXAMPLE 2

In a 2 l glass reactor provided with a stirrer and controlled heating, the following reagents were introduced during 1 hour, the flask being maintained at 70 degrees C.:
330.2 g of monopotassium sulfate.
233.1 g of phosphoric acid (54% $P_2O_5$).
1298 g of tap water, and
147.8 g of phosphate rock (obtained from a cyclone at Arad mine) containing 31.5% $P_2O_5$.

The mixture was agitated for an additional hour and subsequently an additional amount of 184.7 g of the same phosphate rock and 25.2 g of the same phosphoric acid were added. The mixture was filtered after 1 hour on a Buchner filter kept at 70 degrees C. The filter cake, consisting of calcium sulfate, was washed with 3 portions of water (600 mls each).
The amounts of the streams were as follows:
The slurry to be filtered: 2678 g (23.7% solids)
The washed filter cake: 772 g (17.7% humidity)
The filtrate obtained: 1656 g.
The analyses of the filter cake and filtrate were as follows:
The filtrate: $P_2O_5$: 13.6%;
$K_2O$: 6.48%;
CaO: 0.44%;
$SO_4^-$: 2.05%.
The washed filter cake: $P_2O_5$ (total) 2.8%;
$P_2O_5$ (unreacted): 2.3%;
$K_2O$: 0.75%;
CaO: 35%;
$SO_4^-$: 34.7%.

A portion of 800 g of the above filtrate was reacted with 63.5 g of technical grade calcium carbonate (98%) at 70 degrees C. for 60 minutes. After thirty minutes a precipitate of dicalcium phosphate was filtered out on a heated Buchner.
The filter cake of dicalcium phosphate had the following analysis:
$P_2O_5$ = 38.8% (wt. percent).
CaO: $P_2O_5$ = 2.01 (molar ratio), and
$F^-$ = 0.2% (wt. percent).
The filtrate had the following composition:
$P_2O_5$ = 7.6%; CaO = 0.7%;
$K_2O$ = 6.0%; $SO_4^-$ = 2.1%.
To the other portion of filtrate (obtained in step a) an amount of 180 g of the above washed dicalcium phosphate (40% humidity) and 214 g of a solution of monopotassium sulfate (40% concentration) were added during 30 minutes at 70 degrees C. After about 1 hour, the resulting slurry was filtered on a Buchner heated at 70 degrees centigrade. The resulting slurry had the following composition:
$P_2O_5$ = 14.6%; $K_2O$ = 8.05%;
CaO = 0.49%; $SO_4^-$ = 2.54%.
The washed filter cake resulted thereof had the following analysis:
$P_2O_5$ = 2.45%; $K_2O$ = 0.12%; CaO = 33.4%;
$SO_4^-$ = 46.2%.
The analysis of the cake showed that it consisted of substantially pure calcium sulfate.
From the above filtrate, pure crystals of monopotassium phosphate were obtained by crystallization, with the following analysis:
$P_2O_5$ = 50%; $K_2O$ = 36.2%;
CaO = 0.2%; $SO_4^-$ = 2.2%.

EXAMPLE 3

In the same reactor as in Example 1, the following reagents were introduced during 1 hour:
618 g of monopotassium sulfate;
367 g of phosphoric acid (54% $P_2O_5$);
2,376 g of water, and
274 g of phosphate rock (obtained from cyclone at Arad mine) containing 31.3% $P_2O_5$.

The reaction mixture was agitated for an additional hour. To the resulting mixture an amount of 256 g of the same phosphate rock (Arad) was added. After 1 hour of agitation, an amount of 82 g of dicalcium phosphate dihydrate (40.9% $P_2O_5$) was added to 3,860 g of the slurry resulted above maintaining 70 degrees C. The cake of calcium sulfate was filtered out on a heated Buchner (at 70 degrees centigrade) and washed with 3 equal portions of 860 ml water (heated at 70 degrees centigrade).
The amount of washed cake was 1,276 g (32.6% moisture) and the amount of filtrate was 2,230 g.
The analysis of the filtrate was:
$P_2O_5$: 12.5%; CaO: 0.56%;
$K_2O$: 6.7%; $SO_4^-$: 1.25%.
The analysis of the cake (32.6% humidity) was:
$P_2O_5$: 3.4%; CaO: 35.8%;
$K_2O$: 1.2%; $SO_4^-$: 34.5%.
To the above filtrate, an amount of 252 mls of a slurry of lime [containing 70% Ca(OH), with a 31% solids concentration] was added. After about 30 minutes, dicalcium phosphate precipitated out (the pH being 4.7) and was filtered.
The analysis of the filtrate was as follows:
$P_2O_5$: 7.5%; CaO: 0.09%;
$K_2O$: 5.9%; $SO_4^-$: 1.31%;
MgO: 0.13%.
The analysis of the solid (on dry basis) was as follows:
$P_2O_5$: 36.7%; CaO: 35.1%;
$K_2O$: 0.5%; humidity: 43%.
From the above filtrate, crystals of monopotassium phosphate were recovered by cold crystallization, the crystals having the following composition:
52.2% $P_2O_5$; 34.3% $K_2O$; 0.03% CaO; 0.09% $SO_4$. 3.5 ppm Fe; 0.16 ppm Cu; 6.5 ppm Zn; 0.07 ppm Cd; 12 ppm V; 13 ppm F; 70 ppm Cl; 0.7 ppm Ni; 0.5 ppm Pb.
As appears from the above compositions, the cold crystallization does produce a very pure product.

We claim:
1. A process for the manufacture of substantially pure monopotassium phosphate without utilizing organic solvents which comprises the steps of:
(a) reacting in at least two stages, at a temperature in the range of between 40 to 100 degrees centigrade monopotassium sulfate with a phosphate constituent selected from the group consisting of phosphate rock, dicalcium phosphate or mixtures thereof in the presence of phosphoric acid and in the absence of free sulfuric acid to form a slurry containing phosphoric acid, monopotassium phosphate and calcium sulfate, and separating out the formed calcium sulfate to obtain a filtrate containing phosphoric acid and monopotassium phosphate, the amount of phosphoric acid being in the range of between 5% and 35% of the total $P_2O_5$;
(b) neutralizing at a pH in the range of between 3 to 7 the filtrate obtained in step (a) with a calcium-containing compound comprising $Ca(OH)_2$, CaO or CaCO3 or mixtures thereof to obtain a slurry containing dicalcium phosphate, and separating out the dicalcium phosphate; and (c) crystallizing, from the filtrate obtained in step (b) substantially pure monopotassium phosphate.

2. A process according to claim 1, wherein the phosphoric acid in step (a) is produced in-situ, from an additional amount of phosphate rock and sulfuric acid.

3. A process according to claim 1, wherein said temperature is maintained in the range of between 60 to 80 degrees centigrade.

4. A process according to claim 1, wherein the dicalcium phosphate obtained in step (b) is recycled in step (a).

5. A process according to claim 1, wherein said pH is in the range of between 3.5 to 5.

6. A process according to claim 1, wherein by said neutralization an equimolar mixture of monopotassium phosphate and dipotassium phosphate is obtained.

7. A process according to claim 1, wherein metal impurities and fluorides present in phosphate rock are eliminated with the gypsum separated in step (a) or dicalcium phosphate separated out in step (b).

8. A process according to claim 1, wherein the calcium sulfate formed in step (a) can be easily removed due to its filtration properties.

9. A process according to claim 8, wherein some of the organic matter present in phosphate rock is eliminated with the calcium sulfate.

* * * * *